(12) United States Patent
Zeitlinger et al.

(10) Patent No.: US 7,857,359 B2
(45) Date of Patent: Dec. 28, 2010

(54) QUICK CONNECTOR FOR A HEAT EXCHANGER, SUCH AS A RADIATOR

(75) Inventors: Jürgen Zeitlinger, Reutlingen (DE); Klaus Kalbacher, Rangendingen (DE); Thomas Bräuning, Stuttgart (DE)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 12/026,052

(22) Filed: Feb. 5, 2008

(65) Prior Publication Data

US 2008/0191467 A1 Aug. 14, 2008

(30) Foreign Application Priority Data

Feb. 9, 2007 (DE) .................. 10 2007 006 588

(51) Int. Cl.
*F16L 37/00* (2006.01)
(52) U.S. Cl. ...................... 285/308; 285/182
(58) Field of Classification Search ............... 285/305, 285/308, 403, 190, 182, 282, 277, 279, 280, 285/319
See application file for complete search history.

(56) References Cited

U.S. PATENT DOCUMENTS

| | | | | |
|---|---|---|---|---|
| 2,899,215 A * | 8/1959 | Ardito | ................. | 285/308 |
| 3,922,010 A * | 11/1975 | Alf et al. | ................. | 285/282 |
| 4,832,378 A * | 5/1989 | Zepp | ................. | 285/305 |
| 4,887,849 A * | 12/1989 | Briet | ................. | 285/319 |
| 5,022,461 A * | 6/1991 | Potier et al. | ................. | 285/921 |
| 5,341,773 A * | 8/1994 | Schulte et al. | ................. | 285/305 |
| 5,607,192 A * | 3/1997 | Lee | ................. | 285/305 |
| 5,853,201 A * | 12/1998 | Izumi et al. | ................. | 285/179 |
| 6,182,694 B1* | 2/2001 | Sievers et al. | ................. | 285/319 |
| 6,494,498 B2* | 12/2002 | Brandt et al. | ................. | 285/319 |
| 6,505,866 B1* | 1/2003 | Nakamura et al. | ................. | 285/423 |
| 6,679,528 B1* | 1/2004 | Poder | ................. | 285/305 |
| 6,848,723 B2* | 2/2005 | Lamich | ................. | 285/319 |
| 7,284,774 B2* | 10/2007 | Bauer et al. | ................. | 285/319 |
| 7,302,818 B2* | 12/2007 | Usuzaki et al. | ................. | 285/319 |
| 7,401,820 B2* | 7/2008 | Niki | ................. | 285/305 |

FOREIGN PATENT DOCUMENTS

| | | |
|---|---|---|
| DE | 10017679 | 9/2001 |
| DE | 10203521 | 7/2003 |
| JP | 2001-208265 | * 8/2001 |

* cited by examiner

*Primary Examiner*—David E Bochna
(74) *Attorney, Agent, or Firm*—Michael Best & Friedrich LLP

(57) ABSTRACT

A quick-action closure coupling for connecting a supply or discharge line to a wall of a collecting tank of a heat exchanger. The coupling can include a first coupling part and a second coupling part dimensioned to mate together. At least one sealing ring can be positioned between the first and second coupling parts. A latch can be provided in order to lock the coupling parts together. In order to simplify the quick-action closure coupling, the terminal end of the one coupling part can have a mitered cutout into which is received a portion of the other coupling part.

17 Claims, 6 Drawing Sheets

SECTION A-A

SECTION B-B

QUICK CONNECTOR FOR A HEAT EXCHANGER, SUCH AS A RADIATOR

CROSS-REFERENCE TO RELATED APPLICATIONS

Priority is hereby claimed to German Patent Application No. DE 10 2007 006 588.6, filed Feb. 9, 2007, the entire contents of which is incorporated herein by reference.

SUMMARY

The invention relates to a quick-action closure coupling for connecting a supply or discharge line to the wall of the collecting tank of a heat exchanger, including a first coupling part and a second coupling part with a radially inner peripheral wall. The first coupling part has a radially outer peripheral wall, with at least one sealing ring being arranged between the peripheral walls, and with latching points being provided in order to lock the coupling parts.

DE 100 17 679 C1 discloses a conventional quick-action closure coupling. The construction presented in said document can be considered to be advantageous because it permits a compact, space-saving design of the quick-action closure coupling which therefore meets the demands of vehicle manufacturers. This applies in particular if one of the two coupling parts as presented in the cited disclosure is to be embodied as an angle piece or the like. Because the second coupling part of the conventional quick-action closure coupling has, in addition to the radially inner peripheral wall, a radially spaced-apart second peripheral wall, the producibility of the coupling part appears to be impaired. The peripheral wall of the first coupling part is situated, in the coupled state, between the two peripheral walls of the line-side or of the second coupling part. In addition, in the conventional design, a securing ring is provided, which is intended to improve stability but which also increases the expenditure.

One independent object of the invention is that of creating a quick-action closure coupling which should have a more simple design and which, with regard to compactness, should at least stay in line with the described prior art. As explained in more detail below, this and other objects are achieved by one or more of the embodiments of the present invention.

According to one embodiment of the present invention, the radially outer peripheral wall has a mitered cutout into which the second coupling part engages. In a preferred design, the peripheral wall of the line-side or of the second coupling part nestles tightly against the edge of the cutout. A further advantage was revealed as a result, specifically that of the mitered cutout being provided with guiding properties for the coupling parts. This means that the two coupling parts, as they are pressed together axially, can slide into the operating position about a defined rotational angle about the axis. This so-called "centering action" can be considered to be an important advantage for the user.

The possibility of a very compact configuration is also provided. In particular, when the one coupling part is to be embodied as an angle pipe, the coupling part can be arranged in the direct vicinity of the wall of the collecting tank. The installation space is thereby utilized well.

It is provided that an anti-twist device, such as, for example, in the form of a lug which engages into a groove, is formed between the line-side (second) coupling part and the tank-side (first) coupling part. It is also possible for projections to be arranged on one coupling part, which projections are supported in the mitered cutout and which also act as an anti-twist device and as an anti-tilt device.

In some embodiments, the peripheral wall has at least two opposing grooves or slots which belong to the latching points.

In some embodiments, the line-side, second coupling part has at least two elastic arms on which are formed other projections which, in the closed position, engage into the slots or grooves.

It is advantageous for a holding groove for the sealing ring to be arranged on one of the coupling parts, with the sealing ring being situated, in the closed position (operating position), between the peripheral walls. The holding groove has the advantage over the cited prior art that it is possible to dispense with a securing ring.

In order to be able to use a simply-shaped sealing ring, for example a so-called O-ring, it is provided that the sealing ring, in the closed position, is arranged in a plane which is arranged axially further towards the tank-side coupling part than the depth of the cutout. It can also be considered advantageous for the sealing face to be situated at the inside on the tank-side coupling part, because damage can often occur to the outer side of the tank-side coupling part during the course of production of the heat exchanger, which damage adversely affects the sealing action.

Other aspects of the invention will become apparent by consideration of the detailed description and accompanying drawings.

BRIEF DESCRIPTION OF THE DRAWINGS

The invention is now briefly described in various exemplary embodiments with reference to the appended drawings. The figures show the following.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIGS. 1-9 illustrate an exemplary embodiment of the present invention in which two coupling parts A and B and a collecting tank 1 of the heat exchanger (not illustrated) have been produced from plastic. In this exemplary embodiment, it is also provided that the first coupling part A is formed in one piece or integrally with the collecting tank 1. The second coupling part B is embodied as an angled pipe. The second coupling part B has a peripheral wall B1 arranged radially at the inside. A holding groove for an O-ring seal D is formed in the peripheral wall B1. The seal D ensures the required sealing action between the peripheral wall B1 and the radially outer peripheral wall A1 which belongs to the first coupling part A.

Figures 1, 2:
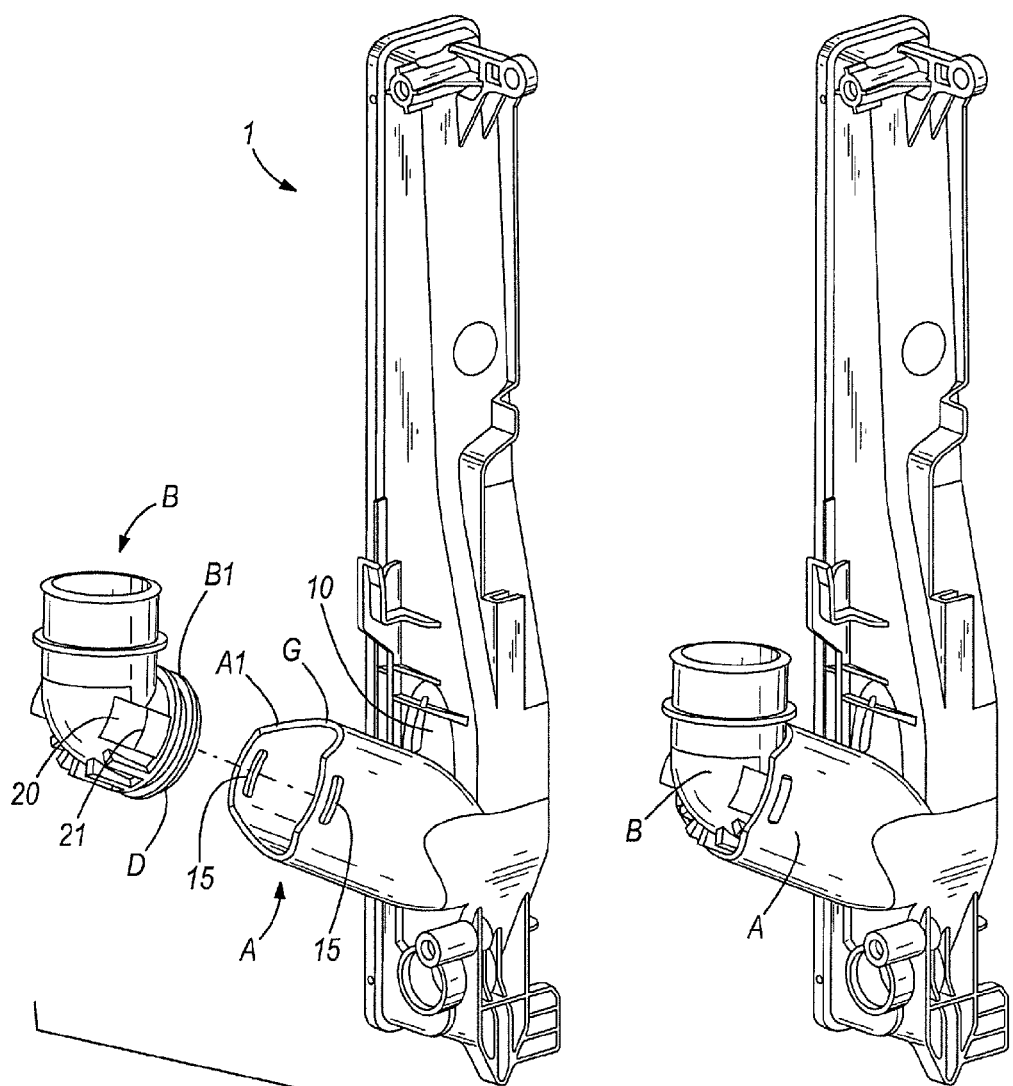
FIGS. 1 and 2 show the collecting tank of a heat exchanger with a quick-action closure coupling in coupled and in non-coupled states.
Figure 3:
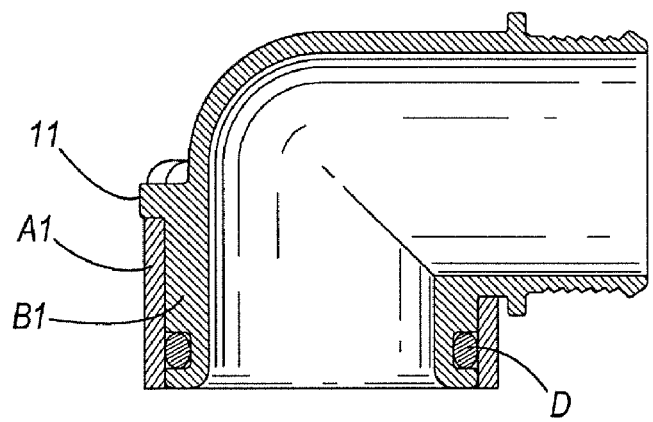
FIGS. 3-9 show various views or sections of the quick-action closure coupling from FIGS. 1 and 2.
Figure 4:
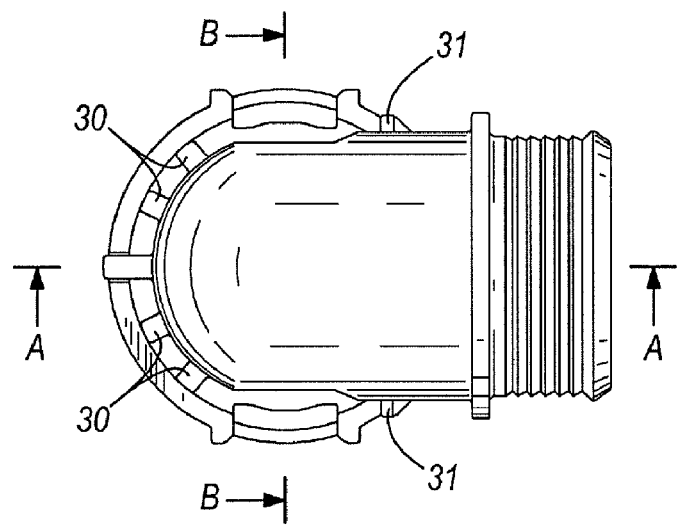
Figure 5:
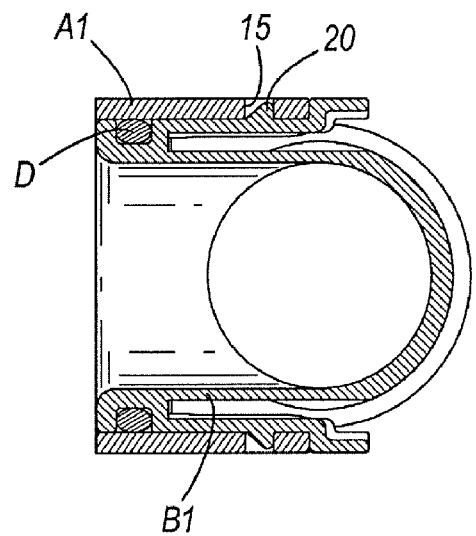
Figure 6:
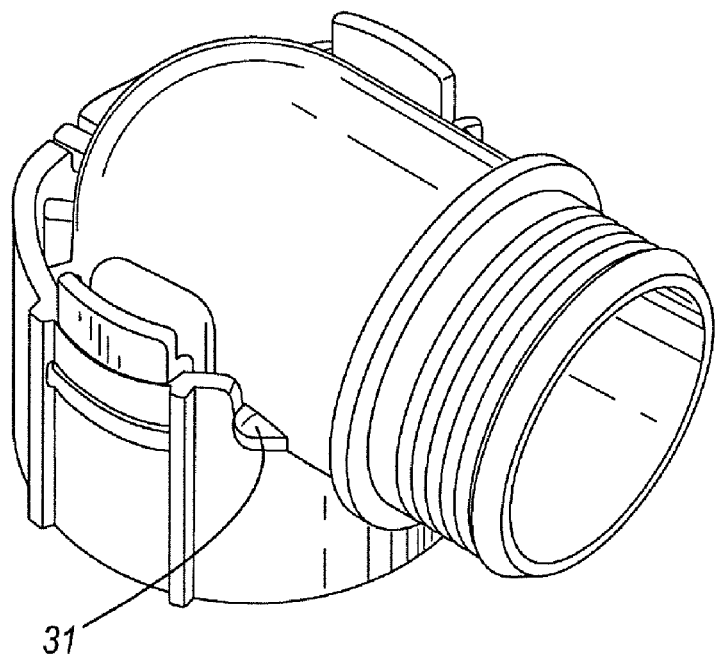
Figure 7:
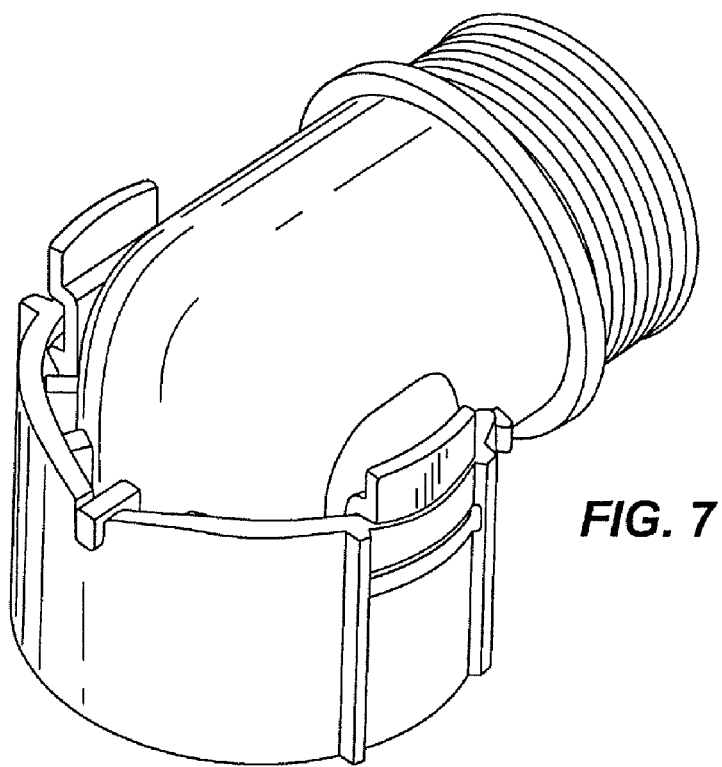

The first coupling part A is formed with a mitered cutout G. The peripheral wall B1 of the second coupling part B engages into the cutout G, which leads to an uncomplicated, compact shape configuration. At this point, it can be pointed out that the length of the first coupling part A has been illustrated to be larger than it should be in FIGS. 1 and 2. In a practical application, the coupling part A will thus be very short, with the second coupling part B then bearing closely against the wall of the collecting tank 1. By way of example, a fairly short coupling part A is provided in FIGS. 6-9. The seal D is situated outside the region of the cutout G in order that the sealing action is not adversely affected. The provision of fins 30 or the like, which fit precisely into the intermediate space between the two peripheral walls A1 and B1 and which thereby also improve the stability, also serve this purpose. The two projections 31 which are formed on the inner peripheral wall B1 and which are supported on the mitered cutout G also aim in this direction (FIGS. 4 and 6).

Figure 8:
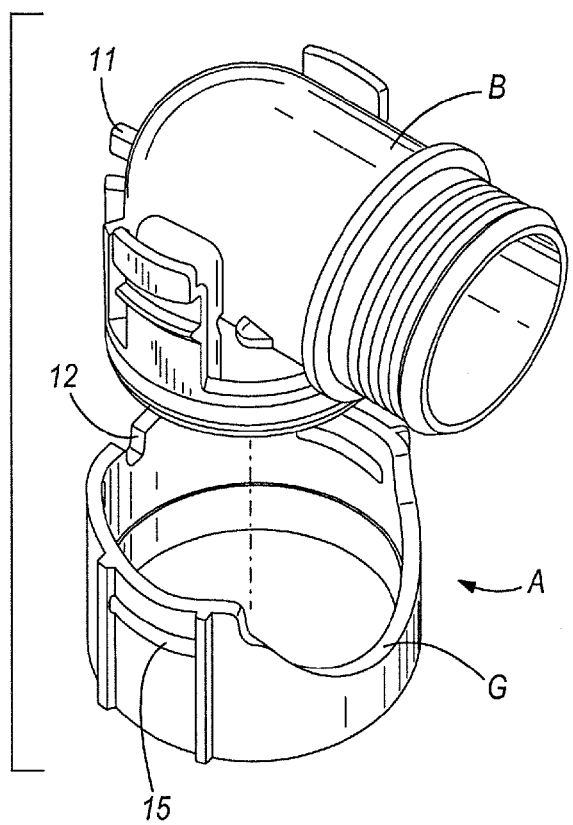
Figure 9:
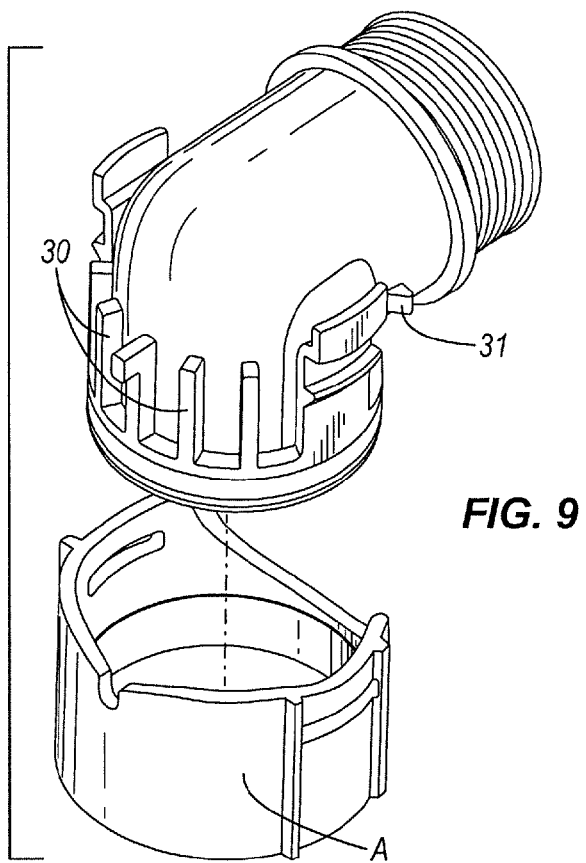

Primarily the lug 11 on the inner peripheral wall B1 serves as an anti-twist device between the coupling parts A and B, which lug 11 corresponds with a notch 12 in the outer peripheral wall A1 (for example FIG. 8).

In order to prevent the coupling parts A and B from being detached from one another, latching points have been provided in the illustrated exemplary embodiments, in which latching points are embodied as slots 15 in the outer peripheral wall A1 and as projections 21 which are arranged on elastic arms 20. The arms 20 are formed in one piece with the inner peripheral wall B1. As the second coupling part B is plugged into the first coupling part A, the arms 20 are pressed against the inner peripheral wall B1 until the projections 21 latch into the slots 15. The arms 20 can, for detachment, be pressed together in order to remove the form-fitting action between the projections 21 and the slots 15 again.

In an alternative exemplary embodiment which is not shown, slots 15 are likewise provided in the outer peripheral wall A1. Outwardly open grooves are however formed on the inner peripheral wall B1. Here, a bracket is then used which engages through the slots 15 into the grooves in order to prevent the coupling parts A and B from being detachable from one another. In order to detach the coupling parts, the bracket must be removed or at least moved out of the locking position.

Figure 10:
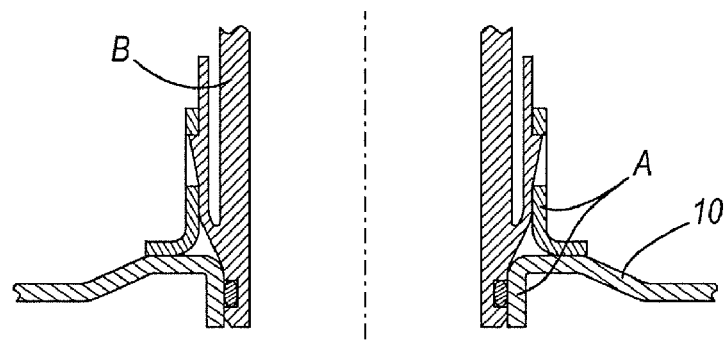
FIGS. 10-12 show another exemplary embodiment, in which the first coupling part is not integrally formed with the collecting tank.
Figure 11:
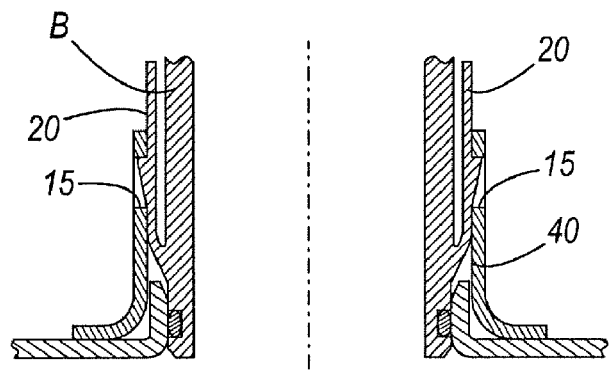
Figure 12:
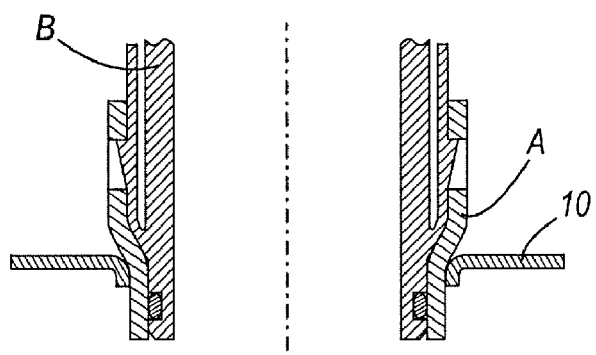

FIGS. 10-12 diagrammatically illustrate an exemplary embodiment in which the first coupling part A is not formed integrally with the collecting tank 1. In this and other embodiments, the collecting tank 1 could be composed of metal. The second coupling part B is composed of plastic, similarly to the first exemplary embodiment. In this exemplary embodiment, as per FIG. 10 or 11, the outer peripheral wall A1 is formed from an opening flange of the collecting tank 1 and an integrally soldered connecting pipe 40. In FIGS. 10 and 12, the opening flange points inwardly into the collecting tank 1 (not shown), and outwardly in FIG. 11. The outer peripheral wall A1, that is to say the connecting pipe 40, of the exemplary embodiment also has a mitered cutout G into which the second coupling part B engages, even if this is not shown in the diagrams.

Figure 15:
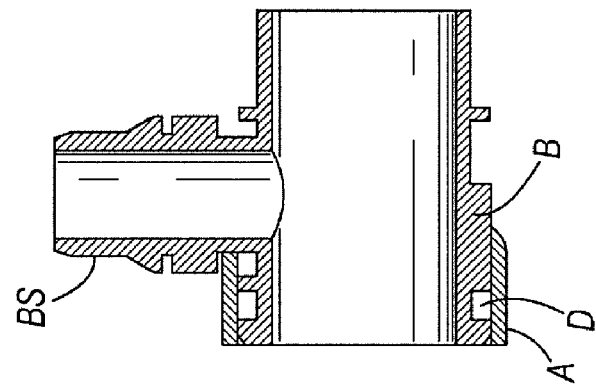
FIGS. 13-15 show a further exemplary embodiment.
Figure 14:
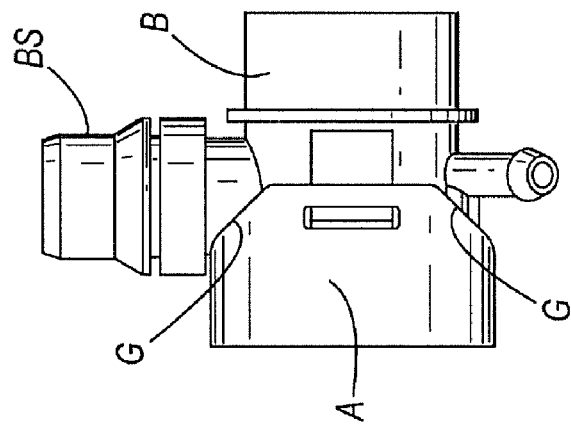
Figure 13:
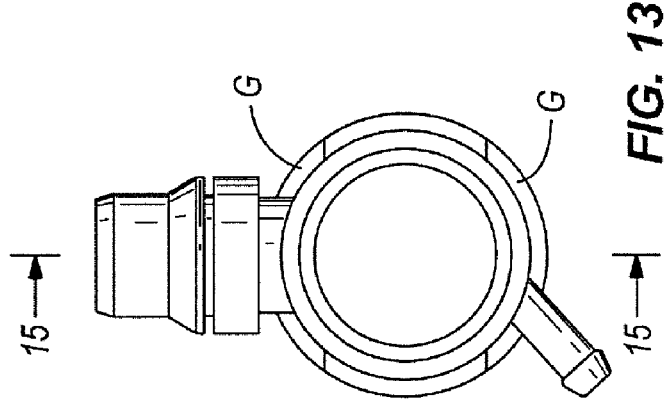

The exemplary embodiment of FIGS. 13-15 shows two coupling parts A and B which are of approximately straight design, that is to say not as an angle pipe in the above-described sense. The coupling part B which is the line-side coupling part in fact has a branch connecting pipe (BS) which, in this exemplary embodiment, is formed in one piece with the coupling part B. In turn, the branch connecting pipe, in the operating position which is shown in the figures, nestles into the mitered cutout G of the tank-side coupling part A and likewise leads to the above-described advantages. FIG. 15 shows the section A-A which is indicated in the plan view of FIG. 13. FIG. 14 shows a side view of the same coupling. As can also be seen from the figures, the coupling part A here has two opposite mitered cutouts G. A second branch connecting pipe is situated in the second mitered cutout G.

Various features and advantages of the invention are set forth in the following claims.

What is claimed is:

1. A quick-action closure coupling for connecting a supply or discharge line to a wall of a collecting tank of a heat exchanger, the quick-action closure coupling comprising:
a first coupling part having a tubular shape defined at least in part by a wall with exterior and interior surfaces;
a second coupling part dimensioned to releasably mate with the first coupling part, the second coupling part having a first portion for conveying a fluid in a first direction and a second portion for conveying a fluid in a second direction non-parallel to the first direction, the second portion extending through a recess in a terminal end of the wall of the first coupling part when the first and second coupling parts are mated with one another;
a seal positioned between the first and second coupling parts when the first and second coupling parts are mated with one another; and
a latch at least partially defined by portions of the first and second coupling parts to lock the first and second coupling parts together.

2. The quick-action closure coupling according to claim 1, wherein the second coupling part is embodied as an angled part which engages into the recess.

3. The quick-action closure coupling according to claim 1, wherein an anti-twist device in the form of a lug, which engages into a groove, is formed between the first coupling part and the second coupling part.

4. The quick-action closure coupling according to claim 1, wherein the wall surfaces of the first and second coupling parts have at least two opposing grooves which provide the latch.

5. The quick-action closure coupling according to claim 4, wherein the second coupling part has at least two elastic arms on which are formed projections which, in a closed position, engage into the grooves.

6. The quick-action closure coupling according to claim 5, wherein the elastic arms, in the closed position, are manually movable in order to detach the coupling parts from one another.

7. The quick-action closure coupling according to claim 1, wherein a holding groove for the seal is arranged on one of the coupling parts, with the seal as a sealing ring being situated, in a closed position, between the first and second coupling parts.

8. The quick-action closure coupling according to claim 7, wherein the sealing ring, in the closed position, is positioned in a plane which is positioned axially further towards the second coupling part than the extent of the depth of the recess.

9. The quick-action closure coupling according to claim 7, wherein a holding groove is positioned on an outer side of a wall surface of the second coupling part, with the sealing ring sealing off against an inner side of the wall of the first coupling part.

10. The quick-action closure coupling according to claim 1, wherein projections are arranged on the wall of the second coupling part.

11. The quick-action closure coupling according to claim 10, wherein the projections are supported on the recess, and wherein the projections are situated in spacing between the wall surfaces of the first and second coupling parts.

12. The quick-action closure coupling according to claim 1, wherein the recess is an arcuate cutout which extends preferably over less than half of the wall.

13. A quick-action closure coupling for connecting a supply or discharge line to a wall of a collecting tank of a heat exchanger, the quick-action closure coupling comprising:
    a first coupling part having a tubular shape defined at least in part by a wall with exterior and interior surfaces;
    a second coupling part dimensioned to releasably mate with the first coupling part, the second coupling part having a portion extending through a recess in a terminal end of the wall of the first coupling part and conveying a fluid;
    a seal positioned between the first and second coupling parts when the first and second coupling parts are mated with one another; and
    a latch defined by portions of the first and second coupling parts to lock the first and second coupling parts together, the latch being accessible from outside of the first and second coupling parts.

14. The quick-action closure coupling according to claim 13, wherein the second coupling part is embodied as an angled part which engages into the recess.

15. A quick-action closure coupling for connecting a supply or discharge line to a wall of a collecting tank of a heat exchanger, the quick-action closure coupling comprising:
    a first coupling part having a tubular shape defined at least in part by a wall with exterior and interior surfaces;
    a second coupling part dimensioned to releasably mate with the first coupling part, the second coupling part having a portion extending through a recess in a terminal end of the wall of the first coupling part and conveying a fluid, and the recess preventing rotation of the second coupling part relative to the first coupling part when the first and second coupling parts are mated with one another;
    a seal positioned between the first and second coupling parts when the first and second coupling parts are mated with one another; and
    a latch defined by portions of the first and second coupling parts to lock the first and second coupling parts together.

16. The quick-action closure coupling according to claim 15, wherein the second coupling part is embodied as an angled part which engages into the recess.

17. A quick-action closure coupling for connecting a supply or discharge line to a wall of a collecting tank of a heat exchanger, the quick-action closure coupling comprising:
    a first coupling part having a tubular shape defined at least in part by a wall with exterior and interior surfaces, the first coupling part conveying a fluid in a first direction;
    a second coupling part dimensioned to releasably mate with the first coupling part, the second coupling part having a portion extending through a recess in a terminal end of the wall of the first coupling part and for conveying a fluid in a second direction substantially non-parallel to the first direction;
    a seal positioned between the first and second coupling parts when the first and second coupling parts are mated with one another; and
    a latch at least partially defined by portions of the first and second coupling parts to lock the first and second coupling parts together.

* * * * *